United States Patent [19]

Ono et al.

[11] Patent Number: 5,326,605
[45] Date of Patent: Jul. 5, 1994

[54] REACTIVE PRESSURE SENSITIVE ADHESIVE COMPOSITION, SEALER TAPE, SHEET OR MOLDING BY USE THEREOF

[75] Inventors: Kiyoshi Ono; Yoshio Kishimoto; Tetsuhito Satou, all of Tokyo, Japan

[73] Assignee: Nichiban Company, Limited, Tokyo, Japan

[21] Appl. No.: 66,929

[22] Filed: May 26, 1993

Related U.S. Application Data

[63] Continuation of Ser. No. 796,894, Nov. 25, 1991, abandoned, which is a continuation of Ser. No. 259,821, Oct. 19, 1988, abandoned.

[30] Foreign Application Priority Data

Oct. 22, 1987 [JP] Japan ................................. 62-266899
Oct. 22, 1987 [JP] Japan ................................. 62-266901

[51] Int. Cl.$^5$ ............................................. C09J 7/02
[52] U.S. Cl. ........................................ 428/40; 428/220; 428/355
[58] Field of Search .......................... 428/355, 40, 220

[56] References Cited

U.S. PATENT DOCUMENTS

| | | | |
|---|---|---|---|
| 4,756,968 | 7/1988 | Ebe | 428/345 |
| 4,845,147 | 7/1989 | Blum | 526/203 |
| 4,845,149 | 7/1989 | Frazee | 526/203 |
| 4,913,960 | 4/1990 | Kuroda | 428/345 |

Primary Examiner—Jenna L. Davis
Attorney, Agent, or Firm—Foley & Lardner

[57] ABSTRACT

A reactive pressure sensitive adhesive composition which comprises at least one material selected from the group consisting of saturated polyester resins, acrylic rubbers, acrylic elastomers, polybutadienes and acrylic pressure sensitive adhesives which are all non-flowable at normal temperature and at least one reactive compound selected from the group consisting of (meth)acrylic urethane monomers, oligomers thereof, other (meth)acrylate monomers and oligomers thereof, and sealer tape, sheet or molding which includes the composition.

10 Claims, No Drawings

REACTIVE PRESSURE SENSITIVE ADHESIVE COMPOSITION, SEALER TAPE, SHEET OR MOLDING BY USE THEREOF

This application is a continuation of application Ser. No. 07/796,894, filed Nov. 25, 1991 now abandoned which in turn is a continuation of application Ser. No. 07/259,821, filed Oct. 19, 1988 now abandoned.

BACKGROUND OF THE INVENTION

This invention relates to a reactive pressure sensitive adhesive composition curable with heat or ionized radiation, and a sealing tape or sheet or molding by use thereof. More particularly, the present invention relates to a reactive pressure sensitive adhesive composition, which has initially adhesive force but generates bonding force though curing under melting by heat or curing as such by light, and to a sealing tape or sheet comprising the above reactive pressure sensitive adhesive layer having a thickness of about $10^{-5}$ to $10^{-2}$ m applied on a substrate surface or to a molding comprising the above reactive pressure sensitive adhesive which has any desired shape.

Pressure sensitive adhesive tape or sheet comprising the above pressure sensitive adhesive applied on a substrate surface has tackiness at normal temperature and can be plastered onto an objective material without any preliminary operation. Besides, it can be advantageously plastered again and therefore has been used in a variety of fields. However, what we call "pressure sensitive adhesive" has the drawback that it has generally weaker adhesive force as compared with adhesives. Also, since the tape is formed by coating a tape substrate with pressure sensitive adhesive, it cannot be plastered without a gap onto a site with a complicated shape, for example, a site with stepped difference, or a site which is recessed or protruded on account of thickness, hardness, firmness, etc. possessed by the substrate. Further the pressure sensitive adhesive tape involves therein a problem in water resistance, solvent resistance and heat resistance.

On the other hand, paints, adhesives, sealing materials are adaptable for complicated shapes, curved surfaces, holes, projections, stepped differences, gaps, etc. and also the curing reaction can be advantageously utilized in order to improve water resistance, solvent resistance and heat resistance of the pressure sensitive adhesive tape. However, these paints, adhesives and sealing materials require pretreatment such as mixing with a curing agent and they are ordinarily in the form of sol or paste contained in a solvent, and therefore many problems are involved in their handling, since some of them are difficult to be handled directly with hands or must be handled in a vessel due to their flowability. Also, care must be taken about contamination against the portions except for target portions to be applied due to flowing, sagging and splash during applications, and removal of the material once contaminated is extremely difficult and is frequently impossible.

Most of the sealing materials to be used in the vehicle body steps, the assembling steps or armoring steps of automobiles, ship, railroad vehicles, aircrafts, rockets, etc. are in a form of paste and those in a form of tape can be seen only in a part thereof. Tape-shaped sealing materials are difficult to have sufficient sealing effect at the site with a complicated shape, involving also a problem in water resistance and also weak adhesive force to be readily peeled off. However, since a very smooth surface can be formed, they have been used in applications where only appearance is made much of. On the other hand, paste-like sealing materials generally used frequently have excellent sealing effect and adhesive force, but cumbersome operation is required for making the appearance smooth and therefore they have been utilized at the sites in the inner portions which cannot be seen or which can be scarcely observed. However, in recent years, good appearance has been demanded by the users, particularly in the field of automobiles, even to the details which cannot be scarcely observed. For this reason, it has become necessary to have a sealing material endowed with both a beautiful appearance after application of the tape-shaped sealing material and sealing effect and adhesive force of the paste-like sealing material. In addition, for the paste-like sealing materials, a tool for exclusive use (usually gun) has been used in application. Accordingly, at narrow places where such gun cannot enter or working can be done with difficulty even if it can enter, not only workability is poor, but erroneous attachment of the sealing material onto places other than the intended areas will require enormous labor for wiping off and this cannot necessarily be removed completely.

SUMMARY OF THE INVENTION

In view of the state of the art as described above, the present inventors have made intensive efforts in order to obtain a sealing material which has both only the good features of pressure sensitive adhesives and only the good features of paints, adhesives and sealers and in which shortcomings of these have been removed, and consequently accomplished the present invention. The product invented by the present inventors has an adhesive force which enables plastering onto a surface without any preliminary operation and fixing until completion of curing. Besides, it can be removed without any contamination on a plastered portion even after once plastered and thereafter can be plastered again, and curing is once performed according to a certain method, the present product exhibits the same quantity and performance as the conventional paints, adhesives, sealing materials, protective film forming agents or binder agents of organic powder, since the present product is well adaptable to a complicated shape such as curved surface, holes, projections, stepped differences, gaps, etc. As the curing method, heat, light, ionized radiation can be utilized depending on the object, the processes, the properties of the pigment and economy.

Heretofore, thermosetting sheets, hot melt adhesives have been already made commercially available, there has not yet been any material which is tacky under normal state and curable during heating process.

The present invention provides a reactive pressure sensitive adhesive composition which comprises at least one material selected from the group consisting of saturated polyester resins, acrylic rubbers, acrylic elastomers, polybutadienes and acrylic pressure sensitive adhesives which have cohesive force and are all non-flowable at normal temperature and at least one reactive (curable) compound selected from the group consisting of (meth)acrylic urethane monomers, oligomers thereof, other (meth)acrylate monomers and oligomers thereof, and a sealing tape or sheet or molding comprising the above reactive pressure sensitive adhesive composition applied onto a substrate surface or a mold surface which has been subjected or not subjected to the removing agent treatment.

DESCRIPTION OF PREFERRED EMBODIMENTS

From the above mentioned combinations of two kinds of compounds or materials in the present composition, there can be obtained a sealing material that exhibits tackiness under ambient conditions is readily cured with heat, light, ionized radiation, and also has extremely tough or elastic physical property after curing. The specific feature of the present invention resides in having tackiness exhibited without using a tackiness-imparting resin of low molecular weight at all. Therefore, it has excellent solvent resistance and heat resistance after curing.

Cohesive force is poor in the low molecular weight substances such as reactive (meth)acrylate urethane resin monomers or oligomers thereof and other reactive (meth)acrylate resin monomers or oligomers, although they may be solid at normal temperature. On the other hand, saturated polyester resins, polybutadiene resins, acrylic elastomers, acrylic rubbers and acrylic pressure sensitive adhesive themselves are not as reactive as the reactive low molecular acrylates described above. The present inventors were successful in obtaining a curable composition which is tacky at normal state by combination of these two kinds of materials or compounds.

The acrylic pressure sensitive adhesives to be used as the material which is one of two essential components of the present composition may include known polymer composing the acrylic pressure sensitive adhesive such as acrylic type polymers, acrylic type copolymers, etc. Namely, the acrylic polymers may include acrylic ester type polymers of butyl acrylate, 2-ethylhexyl acrylate, octyl acrylate, nonyl acrylate, and the acrylate type copolymers may include a copolymer of the above described acrylic esters and acrylic acid, itaconic acid, methyl (meth)acrylate, ethyl acrylate, acrylo nitrile, maleic acid, acrylamide.

The reactive compound selected from the group consisting of (meth)acrylic urethane monomers, oligomers thereof, other (meth)acrylate monomers and oligomers thereof to be used in the present invention is a liquid or solid preferably having a viscosity at normal temperature of $10^2$ cps or higher, while the saturated polyester resins, acrylic rubbers, acrylic elastomers polybutadienes or acrylic pressure sensitive adhesives having cohesive force are a resin which is non-flowable at normal state having a glass transition point of room temperature or lower. By dispersing uniformly or making compatible by melting or dissolving these resins, the reactive pressure sensitive adhesive agent of the present invention can be obtained. The product obtained has no flowability at normal temperature and had adequate tacky and cohesive force, and therefore it can be supplied in all kinds of forms. For example, strands, pellets, sheets, blocks may be included.

Among the above described reactive compound selected from the group consisting of (meth)acrylic urethane monomers, oligomers thereof, other (meth)acrylate monomers and oligomers thereof, particularly preferable are (meth)acrylic urethane monomers and oligomers thereof.

The above described other (meth)acrylate monomers may include (meth)acrylates monomers having mono- di-, tri- or tetra-functional groups, as exemplified by cyclohexyl methacrylate, 2-hydroxyethyl methacrylate, 2-hydroxyethyl acrylate, dimethylaminoethyl methacrylate, ethylene glycol dimethacrylate, trimethylolpropane tri(meth)acrylate, 1,6-hexanediol di(meth)acrylate, 2-(meth)acryloyloxyethyl phthalic acid, mono(2-methacryloyloxyethyl)acid phosphate, butoxyethyl acrylate, ethylcarbitol acrylate, methyl triglycol acrylate, tetrahydrofurfuryl acrylate, 2-hydroxy-3-phenoxypropyl acrylate, triethylene glycol diacrylate, neopentyl glycol diacrylate, diacetone acrylamide, pentaerythrotol triacrylate, zinc acrylate, calcium acrylate, etc.

Among the above exemplified other (meth)acrylate monomers, particularly preferable are 2-hydroxyethyl methacrylate, trimethylolpropane tri(meth)acrylate, 2-hydroxy-3-phenoxypropyl acrylate, diacetone acrylamide, zinc acrylate, calcium acrylate and mono(2-methacryloyloxyethyl)acid phosphate.

In the present invention, the formulation ratio of said material selected from polyester resins, acrylic rubbers, acrylic elastomers, polybutadienes and acrylic pressure sensitive adhesives to said reactive compound is preferably 7:3 to 2:8 by weight.

In the present pressure sensitive adhesive composition, powder or fine powder of known magnetic materials, electroconductive materials, dielectric materials, fluorescent materials, pigments, organic resins, inorganic materials, metals, etc. can be formulated for filler or other purposes, usually in an amount of 1 to 60 parts by weight, preferably 10 to 20 parts by weight based on the total amount of two essential components, namely the material and the reactive compound, and the thus formulated composition can be utilized as the sealer by forming into pellets, sheets, blocks, etc.

As the curing method, by addition of a photo- or heat-curable catalyst such as appropriate known photosensitizer, thermal reaction initiator, etc. in the above composition, if necessary, curing is possible with either heat, light or ionized radiation, and the curing temperature is adequately controlled in the case of heat.

The above described photo- or heat-curable catalyst to be used in the present invention may include, for example, a benzoin ether type compound, a benzophenone type compound, an acetophenone type compound and a thioxanthone type compound as a photo-curable catalyst, and t-butyl peroxy (2-ethyl hexanate), benzoyl peroxide, t-butyl peroxymaleic acid, t-butyl peroxylaurate, cyclohexanone peroxide, t-butyl peroxy allyl carbonate, 2,2-bis(t-butylperoxy)octane, t-butyl peroxyacetate, t-butyl peroxybenzoate, di-t-butyl diperoxy isophthalate, methyl ethyl ketone peroxide, di-cumyl peroxide, 2,5-dimethyl-2,5-di(t-butylperoxy)hexane, t-butyl cumyl peroxide, di-isopropylbenzene hydroperoxide, di-t-butyl peroxide, p-menthane hydroperoxide, cumene hydroperoxide, t-butyl hydroperoxide, lauroyl peroxide and t-butyl peroxybenzoate as a heat-curable catalyst.

Among the above exemplified catalysts, particularly preferable are benzoin ether type compound and acetophenone type compound as a photo-curable catalyst and benzoyl peroxide, lauroyl peroxide, t-butyl peroxybenzoate, di-t-butyl peroxide and t-butyl hydroperoxide as a heat-curable catalyst.

The formulation ratio of the photo- or heat-curable catalyst is 0.5 to 5.0 parts by weight based on the total amount of said material and said reactive compound taken as 100 parts by weight.

The composition added with the above catalyst can be spread on a releasable paper to prepare a sheet of the reactive pressure sensitive adhesive agent, said sheet is plastered onto an adherent to be attached and heat, U.V. ray or etc. is radiated after the releasable paper is peeled off to give a thick coating. Also, when applied to the seam or concave portion of iron plate, it is useful as substitute for sealer or putty.

By use of the reactive pressure sensitive adhesive as the sealing material, it becomes possible to apply sealing easily even at the portion where such application can be done with difficulty by means of a gun in the prior art. Also, even if there may be once a failure in application, workability can be improved to great extent without contamination, etc., because the sealing material can be cleanly removed.

The present invention is described by referring to the following Examples. However, the present invention is not limited by these Examples.

EXAMPLE 1

| | |
|---|---|
| Saturated polyester "Polyester LP-022" (Nippon Gosei Kagaku Kogyo K.K.) | 70 parts (parts by weight, hereinafter the same) |
| Urethane acrylate "Biscoat 812" 800–1200 cps/50° C. (Osaka Yuki Kagaku Kogyo K.K.) | 30 parts |
| Isobutyl peroxide | 1 part |

The above composition was dissolved in toluene so as to give a solid content of about 30%. The solution was cast into a box made of a releasable paper and the solvent was dried to prepare a reactive pressure sensitive adhesive composition film having a thickness of 500 μm. For the film obtained to be used as the sealing material, it was plastered onto the seam of an iron plate, and after the releasable paper was peeled off, it was cured at 150° C. for 30 minutes.

The above composition had tacky before curing and could be plastered again. Also, during curing, the composition melted and the corners of the film were removed to fill the gap between the iron plates and cured therein, which serves as sealers desired. The cured product did not change even when dipped in boiling water for 1 hour.

EXAMPLE 2

The reactive pressure sensitive adhesive composition film having a thickness of 500 μm obtained in Example 1 was punched into a doughnut shape having an outer diameter of 12 mm and an inner diameter of 6 mm. In place of washer on a bolt having an outer diameter 5 mm, this was clamped onto the iron plates with a nut, followed by heat-curing at 160° C. for 20 minutes.

The reactive pressure sensitive adhesive composition film used in place of washer was melted and cured, and it was found to be suitable for prevention of loosening, water-resistant or water-proof sealer.

EXAMPLE 3

| | |
|---|---|
| Saturated polyester "Vylon 200" (Toyobo Co. Ltd.) | 70 parts |
| Urethane acrylate "Aronix M-1100" 200,000–300,000 cps/50° C. (Toa Gosei Chemical Industries Co. Ltd.) | 30 parts |
| Silica fine powder "Aerosil R-972" (Nippon Aerosil K.K.) | 20 parts |
| Pigment Titanium White average particle size: 0.5 μm | 20 parts |
| Isobutyl peroxide | 1 part |

The above starting material was mixed by a kneader and cast by means of an injection molding machine into a silicone rubber mold of an emblem taken from the vehicle body of an automobile. After cooling, the emblem molding was taken out from the mold. When the emblem molding was plastered onto the vehicle body of an automobile and cured by heating at 140° C. for 20 minutes, the emblem molding was cured to be firmly bonded onto the vehicle body. Also, spraying of a paint over the emblem molding further improved adhesion.

Also, a fluorescent material was mixed in an amount of 30 to 50 parts in the above formulated starting materials to prepare similarly a mold of emblem, which was plastered onto the vehicle body. The emblem plastered emitted luminescence in a dark place, whereby the letters were seen as floated against the dark background.

EXAMPLE 4

For the reactive pressure sensitive adhesive composition film obtained in Example 1, the film was punched previously into a shape of the site at which sealing is to be applied, and then applied to the above described sealing site. By this, workability in applying of sealing could be further improved.

EXAMPLE 5

| | |
|---|---|
| Saturated polyester "Polyester LP-022" (Nippon Gosei Kagaku Kogyo K.K.) | 60 parts |
| Urethane acrylate resin "Artresin UN-9000" 200 cps/60° C. (Negami Kogyo) | 40 parts |
| Pigment Titanium White average particle size: 40 μm | 30 parts |
| "Perloyl IPP" (Nippon Oil & Fats Co., Ltd.) | 2 parts |

The above formulated reactive pressure sensitive add composition was used to prepare a toluene solution similarly as in Example 1, which was cast into a mold to prepare a reactive pressure sensitive adhesive composition film having a thickness of 200 μm. This was plastered onto an iron plate and cured for examination of adhesiveness with the iron plate.

The film cured on the iron plate was found to have adhesiveness of 100/100 according to the cross cut test of the paint.

EXAMPLE 6

| | |
|---|---|
| Acrylic rubber "Toaacron PS-210" (Toa Paint K.K.) | 60 parts |
| Urethane acrylate "Aronix M-1100" 200,000–3000,000 cps/50° C. (Toa Gosei Chemical Industries Co., Ltd.) | 20 parts |
| Acrylate S-122 powder (Nippon Oil & Fats Co., Ltd.) | 20 parts |
| Tert-butyl perbenzoate | 3 parts |

The above composition was dissolved in ethyl acetate so as to give a solid concentration of about 20%, and a polyethylene terephthalate film having a thickness of 25 μm was coated with the above solution so as to give a thickness of 25 μm after drying, to prepare a reactive pressure sensitive adhesive composition tape. This tape was plastered on a paper and an iron of 140° C. was pressed thereon for 2 seconds. As a result, the pressure sensitive adhesive was cured to be adhered onto the paper. When the polyester film was peeled off after cooling of the tape, the cured pressure sensitive adhesive remained on the paper to form a tackiness-resistant coating.

EXAMPLE 7

| | |
|---|---|
| Acrylic rubber "Toaacron PS-210" (Toa Paint K.K.) | 60 parts |
| Acrylate UAS-10 2000 cps/50° C. (Sanyokokusaku Pulp K.K.) | 40 parts |
| Irgacure 907 (Ciba Geigy) | 3 parts |

The above formulated composition was dissolved in ethyl acetate so as to give a solid content of about 20% and a polyester film having a thickness of 25 μm was coated with the above solution so as to give a coating-thickness of 25 μm after drying, to prepare a reactive pressure sensitive adhesive composition tape. The tape was plastered onto a copper plate and irradiated with UV-rays by a high pressure mercury lamp of 80 W/cm$^2$. The tacky surface was cured to be plastered onto the copper plate. This film was found to have an electrical resistance of $10^{13}$ Ωcm.

EXAMPLE 8

| | |
|---|---|
| 2-Ethylhexyl acrylate (98%)-acrylic acid (2%) copolymer pressure sensitive adhesive | 60 parts |
| Acrylate "NK Ester U-4HA" 20,000 cps (Shin-Nakamura) | 40 parts |
| "Perloyl IPP" (Nippon Oil & Fats Co., Ltd.) | 1 part |

The above starting materials were dissolved in ethyl acetate and a polyester PET film subjected to releasing agent treatment was coated with the above solution to prepare a double-coated tape. The double-coated tape was plastered between two sheets of metal plates, cured at 150° C. for 20 minutes and the shear adhesive force was measured. The shear adhesive force was 100 Kg/cm$^2$.

EXAMPLE 9

| | |
|---|---|
| Saturated polyester "Polyester LP-044" (Nippon Gosei Kagaku Kogyo K.K.) | 70 parts |
| Acrylate resin (Sartomer) C-9054 5000 cps/100 F. | 30 parts |
| "Perloyl IPP" (Nippon Oil & Fats Co., Ltd.) | 2 parts |

The above starting materials were dissolved in ethyl acetate and the back side of a decoration sheet was coated with the above solution, which was plastered on an iron plate and adhered thereto by warming by an IR-ray heater for 10 minutes.

EXAMPLE 10

A foil of copper with a thickness of 10 μm was coated with the composition shown in Example 7. The coated product was cut into a strip with 4 mm width by a slitter, mounted with a lead wire at the start of winding, wound up to a 1000 m winding thickness on a core of 1 inch in diameter and attached with a lead wire at the end of winding. This was placed in a heated oven, cured by heating at 150° C. for 40 minutes to prepare a thin coil.

EXAMPLE 11

| | |
|---|---|
| Saturated polyester "Polyester LP-022" (Nippon Gosei Kagaku Kogyo K.K.) | 70 parts |
| Urethane acrylate "Biscoat 812" (Osaka Yuki Kagaku Kogyo K.K.) | 30 parts |
| Isobutyl peroxide | 1 part |
| Urethane resin fine powder (maximum particle size: 50 μm) | 50 parts |

The above formulated composition was uniformly kneaded and then flowed and spread on a polyester (PET) film having a thickness of 25 μm so as to give a thickness of 1 mm to obtain a reactive pressure sensitive adhesive sheet. Tacky surface of the thus obtained sheet has tacky but no flowability. A portion of the sheet was cut out, which was then plastered to cold rolled steel plate (SPCC-B JIS G 3141)) and heated for curing at 140° C. for 20 minutes after peeling of the PET film, to give a non-tacky surface. When sand paper is applied on to surface, grinding can be carried out without blocking or clogging. The above sheet was cooled to −20° C., wound up on a stick having a diameter of 20 mm and curved to an appropriate angle to give no cracking at all in the sheet.

EXAMPLE 12

| | |
|---|---|
| Saturated polyester "Vylon 300" (Toyobo K.K.) | 40 parts |
| Urethane acrylate "Yubisan 893" | 60 parts |
| Benzoyl peroxide | 0.5 part |
| talc | 20 parts |

The above formulated composition was mixed by use of a kneader, applied to a film extruder to give a sheet having a thickness of 1 mm and tackiness at normal temperature. The thus obtained sheet was cut into a width of 20 mm, which was plastered to the edge portion of a steel plate (SPCC-B) having a thickness of 0.8 mm and heated at 140° C. for 20 minutes. The edge portion of the sheet plastered was melt to become round and cured in such a state. The surface of the sheet has luster and smoothness. The steel plate the edge portion of which was plastered was subjected to the spray test by use of 3% aqueous sodium chloride solution to recognize no generation of rust in the edge portion sealed.

EXAMPLE 13

| | |
|---|---|
| Saturated polyester "Polyester LP-022" (Nippon Gosei Kagaku Kogyo) | 70 parts |
| Urethane acrylate "Biscoat 812" (Osaka Yuki) | 30 parts |
| Isobutyl peroxide | 1 part |

The above formulated starting material was dissolved in ethyl acetate so as to give a solid content of about 30% to obtain an ethyl acetate solution of a reactive pressure sensitive adhesive composition. A polyethylene terephthalate film subjected to releasing agent treatment was coated with the above solution, dried, cut into a width of 20 mm and wound up in a form of tape to prepare a sealer tape.

The tape obtained was cut into an appropriate length and plastered onto a seam of iron plates. In determining the position, plastering could be effected again by pressing the tape lightly. After the plastering position was determined, the tape was strongly pressed, and after the polyethylene terephthalate film was peeled off curing was effected by heating at 140° C. for 30 minutes.

The cured product was found to be well adhered to the iron plates and fill the gap cleanly. When water resistance was tested, the sealing effect was also sufficient.

EXAMPLE 14

A polyethylene terephthalate film subjected to releasing agent treatment was coated with the formulated starting materials of 30% ethyl acetate solution shown in Example 13. This was covered with a releasable paper to obtain a sealer sheet. The sealer sheet can be plastered onto a place having a large area, as different from a tape. It can be punched out into any desired shape by a punching working machine, to prepare a worked product capable of being employed for various uses.

For example, a worked product punched out into an inner diameter of 6 mm and an outer diameter of 9 mm can be used for loosening prevention of bolt clamping and water-proof working agent. One punched out into a doughnut shape is sandwiched between a bolt and an iron plate during clamping of the bolt. By doing so, the bolt will not be fallen off before clamping of the bolt with a nut. This may be cured by appropriate application of heating or UV-ray irradiation before clamping with a nut, or alternatively curing may be effected similarly as described above after clamping. The cured product could prevent penetration of water through the threaded hole in addition to prevention of loosening of the screws. (Ordinary double-coated tape has weak water-proof effect). Also, since the sheet can be plastered previously on the backside of a bolt, workability is better than paste-like screw keeper.

EXAMPLE 15

The sealer tape obtained in Example 13 was plastered onto a portion of an object having a complicated three-dimensional surfaces, the substrate of polyethylene terephthalate was peeled off and then another object was pressed onto the upper surface of the exposed reactive pressure sensitive adhesive. In this case because of an appropriate tackiness of the above described reactive pressure sensitive adhesive surface, both objects are kept in a seamed state without separation from each other. When heating was applied as such at 140° C. for 20 minutes, the reactive pressure sensitive adhesive composition was cured and both objects were bonded firmly to each other. Although a sealer tape was used in the above case, the same effect can be obtained by such a procedure that the ethyl acetate solution of the reactive pressure sensitive adhesive prepared in Example 13 is applied onto a portion of an object, dried and thereafter another object is pressed onto the reactive pressure sensitive adhesive surface formed and curing is conducted thereon. Two pieces of iron plates having the same V-shape were prepared and one of the plates was coated with the ethyl acetate solution of the reactive pressure sensitive adhesive on the inner side thereof. The other iron plate was superposed on the coated surface. The two iron plates were bonded firmly each other when heated as such in an oven of 160° C. for 25 minutes.

EXAMPLE 16

| Saturated polyester "Vylon 200" (Toyobo) | 50 parts |
| Urethane acrylate "NK Ester U-4HA" (Shinnakamura Kagaku) | 50 parts |
| "Perloyl IPP" (Nippon Oil & Fats Co., Ltd.) | 0.5 part |

The above formulated starting material was kneaded uniformly and spread into a thickness of 1 mm on releasing paper having a width of 20 mm to prepare a sealing tape, which was wound up in a rolling state. Sealer tape was cut out from the obtained roll into a length of 100 mm, which was applied onto the edge portion of a steel plate having a thickness of 0.8 mm subjected to electrolytic deposition coating. Since the sealer tape has tackiness at normal temperature it adhered to the edge portion with keeping a shape corresponding to the edge portion. When the steel plate having the sealer tape plastered on the edge portion thereof was heated at 140° C. for 30 minutes in such a state that the place was erected vertically, the corner of the sealer tape was melt with heat to become round. However, as the whole of the sealer tape, no saggings or gaps could not be recognized. Thereafter application and printing are carried out to give an excellent adhesion.

EXAMPLE 17

| Saturated polyester "Vylon 300" (Toyobo) | 40 parts |
| Urethane acrylate "Yubisan 893" (Nomure Office) | 60 parts |
| Talc | 20 parts |
| Benzoyl peroxide | 1 part |

The above formulated starting material was mixed uniformly and molded into a stick having a diameter of 5 mm to obtain a stick-shaped sealer molding, which has tackiness but no flowability at normal temperature. The molding was inserted with fingers into a gap of 4 mm in width and 2 mm in depth between two steel plates. Next the molding was heated at 160° C. for 20 minutes and then due to heat during heating the molding was permeated deeply into the inner portion of the gap. The sealer molding flown out from the steel plates was ground with sand paper 240 and application was conducted thereon in an ordinary manner to give a smooth seam which could not be recognized at all.

EXAMPLE 18

| Acrylic rubber "Toaacron PS-210" (Toa Paint K.K.) | 60 parts |
| Urethane Acrylate USA-10 (Sanyo Kokusaku Pulp) | 40 parts |
| Isobutyl peroxide | 0.5 part |

The above formulated starting material was kneaded uniformly by use of a kneader and thereafter and spread on a polyethylene terephthalate film having a thickness of 25 μm subjected to releasing agent treatment to obtain a sealer sheet having a thickness of 500 μm. This sealer sheet was plastered in a width of 20 mm (each side about 10 mm, respectively) on a steel plate having a thickness of 0.8 mm and then the polyethylene terephthalate film was peeled off. When heated at 140° C.

for 20 minutes the corner of the sealer sheet was melt to become round and the edge of the steel plate was uniformly sealed without extrusion of the corner. The steel plate including the edge-sealed portion was curved to an angle of 180° C. to generate no crazing or cracking at all in the sealed portion.

EXAMPLE 19

| | |
|---|---|
| 2-Ethylhexyl acrylate (98%)-acrylic acid (2%) copolymer pressure sensitive adhesive | 60 parts |
| Urethane acrylate "NK Ester U-4HA" (Shinnakamura Kagaku) | 40 parts |
| "Perloyl IPP" (Nippon Oil & Fats Co., Ltd.) | 1 part |

The above formulated starting material was uniformly kneaded and spread in a thickness of 300 μm on a releasing paper to obtain a sealer sheet. From the obtained sealer sheet a strip piece of the sealer sheet having a width of 20 mm and a length of 10 cm was cut out, which was plastered onto a stepped difference portion formed by welding a steel plate having a thickness of 0.8 mm on a steel plate. Although the sealer sheet strip plastered was not sufficiently attached to the corner of the stepped difference due to air existing therein, when heating is applied at 150° C. for 20 minutes, the sealer was permeated also into the corner of the stepped difference to be adhered tightly, with repelling the air. The corner of the sealer applied on the stepped difference had an angle of about 90° C. before heating but after heating it became smooth and the corner disappeared.

EXAMPLE 20

| | |
|---|---|
| Acrylic rubber "Toaacron PS-210" (Toa Paint) | 60 parts |
| Urethane Acrylate "Aronix M-1100" (Toa Gosei Chemical Industries Co., Ltd.) | 16 parts |
| Urethane acrylate monomer | 3 parts |
| Acrylate S-122 | 20 parts |
| Tert-butyl perbenzoate | 3 parts |

The above formulated starting material was treated in the same manner as in Example 19 to prepare the same sealer sheet and when the same test was conducted, the same good results were obtained as in Example 19 in the degree of melting of the sealer or the degree of permeating of the sealer into the stepped difference of the steel.

We claim:

1. A sealer tape, sheet or molding which comprises a non-solvent based reactive pressure sensitive adhesive composition having tackiness under ambient conditions and having tough or elastic physical properties after curing, said pressure sensitive adhesive further having a thickness between approximately 25 μm and 1 cm, comprising a saturated polyester resin which is non-flowable at 5° C. to 35° C., a (meth)acrylic urethane oligomer having a viscosity of $10^2$ cps or higher at 5° to 35° C. and a heat-curable catalyst, said adhesive composition being applied onto a substrate surface or a mold surface which has been optionally subjected to a releasing agent treatment.

2. The sealer tape, sheet or molding according to claim 1, wherein said reactive pressure sensitive adhesive composition further comprises at least one powder or fine powder selected from the group consisting of magnetic materials, electroconductive materials, fluorescent materials, pigments, organic resins, inorganic materials and metals.

3. The sealer tape, sheet or molding according to claim 1, wherein the formulation ratio of said saturated polyester resin to said (meth)acrylic urethane oligomer is 7:3 to 2:8 by weight.

4. The sealer tape, sheet or molding according to claim 1, wherein said heat-curable catalyst is selected from the group consisting of benzol peroxide, lauroyl peroxide, t-butyl peroxybenzoate, di-t-butyl peroxide and t-butyl hydroperoxide.

5. The sealer tape, sheet or molding according to claim 1, wherein the formulation ratio of said heat-curable catalyst is 0.5 to 5.0 parts by weight based on the total amount of said saturated polyester resin and said (meth)acrylic urethane oligomer taken as 100 parts by weight.

6. The sealer tape, sheet or molding according to claim 2, wherein the formulation ratio of said powder or fine powder is 1 to 60 parts by weight based on the total amount of said saturated polyester resin and said (meth)acrylic urethane oligomer taken as 100 parts by weight.

7. The sealer tape or sheet according to claim 1, wherein said reactive pressure sensitive adhesive composition is formed on a substrate surface to a thickness of 25 μm to 1 mm.

8. The sealer tape or sheet according to claim 1, wherein said reactive pressure sensitive adhesive composition is formed by coating the adhesive composition between two sheets of film substrates subjected to a releasing agent treatment.

9. The sealer molding according to claim 1, wherein said mold surface is any desired mold surface.

10. The sealer tape, sheet or molding according to claim 1, wherein said saturated polyester resin is non-flowable at room temperature and said (meth)acrylic urethane oligomer has a viscosity of $10^2$ cps or higher at room temperature.

* * * * *